United States Patent [19]

Umehara et al.

[11] Patent Number: 4,776,616
[45] Date of Patent: Oct. 11, 1988

[54] COUPLING

[75] Inventors: Kazumasa Umehara; Katsushi Washizu, both of Shizuoka; Kazunori Takigawa, Numazu, all of Japan

[73] Assignee: Usui Kokusai Sangyo Kabushiki Kaisha, Shizuoka, Japan

[21] Appl. No.: 53,056

[22] Filed: May 22, 1987

[30] Foreign Application Priority Data

| May 26, 1986 | [JP] | Japan | 61-78918[U] |
| Oct. 14, 1986 | [JP] | Japan | 61-157266[U] |
| Apr. 28, 1987 | [JP] | Japan | 62-64659[U] |
| Apr. 28, 1987 | [JP] | Japan | 62-64660[U] |
| Apr. 28, 1987 | [JP] | Japan | 62-64661[U] |
| Apr. 28, 1987 | [JP] | Japan | 62-64662[U] |

[51] Int. Cl.⁴ .................................... F16L 41/00
[52] U.S. Cl. ......................... 285/156; 285/179; 285/348; 285/351; 285/382; 285/906
[58] Field of Search ............. 285/373, 382, 348, 906, 285/156, 179, 351

[56] References Cited

U.S. PATENT DOCUMENTS

| 3,441,293 | 4/1969 | Bagnulo | 285/382 X |
| 3,858,914 | 1/1975 | Karie et al. | 285/382 |

FOREIGN PATENT DOCUMENTS

| 434908 | 10/1926 | Fed. Rep. of Germany | 285/382 |
| 1801294 | 5/1970 | Fed. Rep. of Germany | 285/382 |
| 511527 | 8/1939 | United Kingdom | 285/382 |

*Primary Examiner*—Dave W. Arola
*Attorney, Agent, or Firm*—Anthony J. Casella; Gerald E. Hespos

[57] ABSTRACT

An improved coupling for connecting a pipe joint and a metal pipe which has a relatively small diameter not exceeding about 30 mm and a wall thickness not exceeding about 2 mm is offered. The coupling is often used to form a pipeline for supplying oil, air, etc. to an automobile, machine or apparatus, or collecting exhaust gas, etc. The coupling is to connect a metal pipe to a pipe joint having a bore defining a fluid passageway, wherein the joint includes a cylindrical wall portion extending from an annular shoulder, and the pipe extends into the cylindrical wall portion and has an end provided with a radially outwardly projecting flange. An elastic seal ring is provided adjacent to the shoulder and the flange. A cylindrical member is disposed between the cylindrical wall portion and the pipe for holding the flange and the seal ring against the shoulder, the cylindrical wall portion having a radially inwardly bent end holding the cylindrical member.

19 Claims, 13 Drawing Sheets

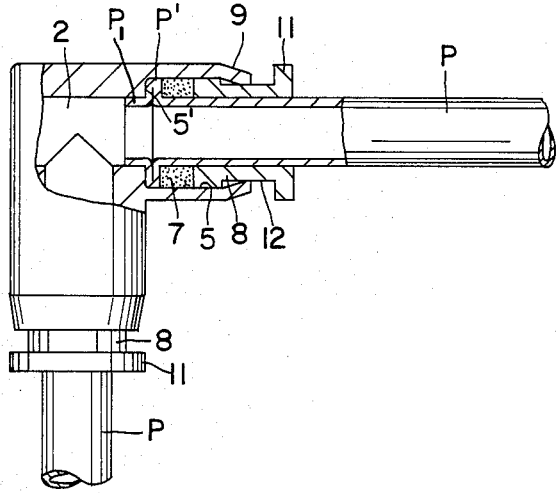

PRIOR ART 4,776,616

COUPLING

BACKGROUND OF THE INVENTION

1. Field of the Invention

This invention relates to an improved coupling for connecting a pipe joint and a metal pipe which has a relatively small diameter not a wall thickness not exceeding about 2 mm, and which is often used to form a pipeline for supplying oil, air, etc. to an automobile, machine or apparatus, or collecting exhaust gas, etc. therefrom.

2. Description of the Prior Art

A known coupling of the type to which this invention pertains is shown by way of example in FIG. 24. A pipe joint 31 has an axial bore 32 which defines a fluid passageway. The bore 32 has a diametrically enlarged portion 35 defined by an annular shoulder formed on the inner wall surface of the joint 31. A metal pipe $P_1$ has an end portion fitted in the enlarged portion 35. The end portion of the pipe $P_1'$ has an outer wall surface welded to the inner wall surface of the joint 31 as shown at W. They are welded manually by means of a burner, or are welded in a heating furnace.

The welding work which is employed for connecting the pipe and the joint, however, presents a number of problems. It is only after the welding work is finished that the pipe and the joint can be electroplated with zinc, a zinc alloy, etc. to obtain the necessary corrosion resistance. The electroplating job complicates the process of pipeline connection and gives rise to a reduction in productivity. It is difficult to form an electroplated layer having a uniform thickness, as it is impossible to maintain a constant distance between the poles and a constant current density throughout the electroplating work. An unduly long time is required for making uniform the thickness of the electroplated layer. The welding of the pipe to the joint often results in localized heating, or overheating. The overheating of the pipe lowers its mechanical strength and the vibration of an engine or machine to which the pipe is connected causes it to crack or break adjacent to its portion welded to the joint.

SUMMARY OF THE INVENTION

It is, therefore, an object of this invention to provide a coupling which can connect a pipe joint and a metal pipe without relying upon any welding work and enables, therefore, the use of a joint and a pipe which are both coated for corrosion resistance and have a uniform coating thickness.

It is another object of this invention to provide a coupling which can effectively absorb any vibration of a pipe connected to a joint and thereby protect it against cracking or breaking due to vibration.

These objects are attained by a coupling for connecting a metal pipe to a joint having a bore defining a fluid passageway, the coupling comprising the joint including a cylindrical wall portion extending from an annular shoulder, the pipe extending into the cylindrical wall portion and having an end provided with a radially outwardly projecting flange, an elastic seal ring provided adjacent to the shoulder and the flange, and a cylindrical member disposed between the cylindrical wall portion and the pipe for holding the flange and the seal ring against the shoulder, the cylindrical wall portion having a radially inwardly bent end holding the cylindrical member.

The joint may be a straight joint, an eye joint, an L-shaped joint, or a multiway joint.

The seal ring is disposed between the shoulder and the flange, or between the flange and the cylindrical member. If the seal ring is disposed between the flange and the cylindrical member, it is possible to provide a vibration absorbing ring on at least one side of the seal ring. It is possible to provide the inside or outside of the pipe with a sleeve having a radially outwardly projecting wall at one end thereof in order to improve its mechanical strength. A reduction in fatigue stress and an improved mechanical strength can also be achieved if a tubular projection is provided axially forwardly of the pipe or the sleeve. If the cylindrical member is provided with a flexible portion on at least its inner surface, it can effectively absorb the vibration of the pipe and prevent it from being scratched. If the pipe includes a diametrically enlarged portion defined by a shoulder and located in the cylindrical wall portion of the joint, it increases the mechanical strength of the coupling and greatly facilitates the positioning of the seal ring, cylindrical member, sleeve or vibration absorbing ring on the pipe.

DETAILED DESCRIPTION OF THE INVENTION

The invention will now be described more specifically with reference to the drawings in which like numerals are used to indicate like parts throughout the various views.

Figure 1:
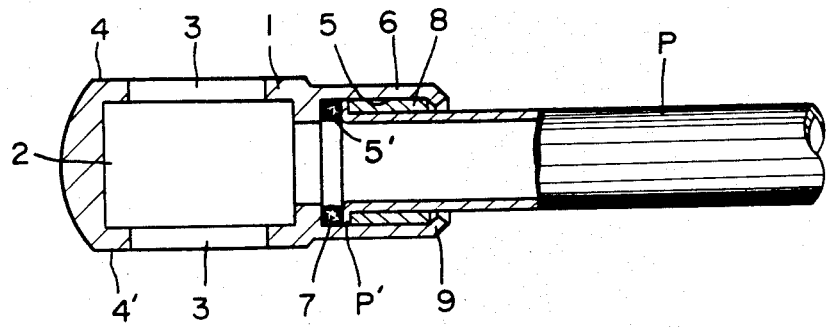
FIG. 1 is a fragmentary longitudinal sectional view of a coupling this invention.
Figure 2:
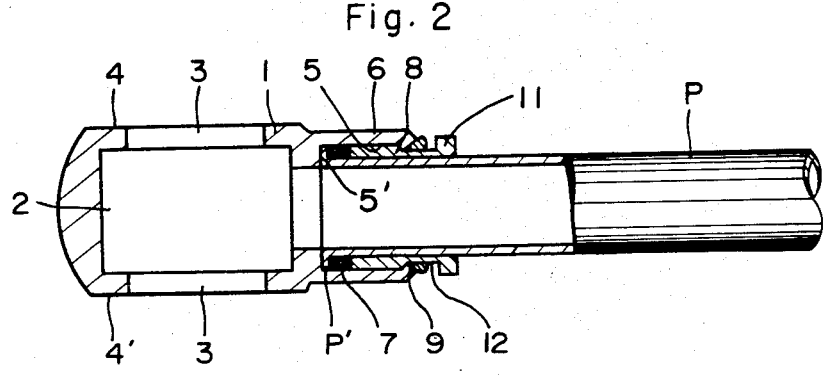
FIGS. 2 to 7 are views similar to FIG. 1, but showing other embodiments of this invention.

Referring first to FIGS. 1 and 2, there are shown couplings of the type which employs an eye Joint. The eye Joint 1 has a bore defining an aanular fluid passageway 2 and a pair of parallel flat walls 4 and 4' which are provided therethrough with holes 3 for mounting the Joint to a base by bolts. The Joint 1 also includes a laterally proJecting cylindrical wall portion 6 having at its inner end an annular opening 5. A metal pipe P extends into the cylindrical wall portion 6 and has an inner end provided with a radially outwardly proJecting flange P' located adJacent to the opening 5. An elastic seal ring 7, which may be formed from rubber, a resin, etc., is provided adJacent to the flange P'. In the coupling of FIG. 1, the seal ring 7 is disposed between a shoulder 5' of the opening 5 and the flange P', and in the coupling of FIGURE the shoulder 5'. A cylindrical member 8 is disposed between the cylindrical wall portion 6 and the pipe P for holding the seal ring 7 and the flange P' against the shoulder 5'. The cylindrical wall portion 6 has a radially inwardly bent outer end 9 holding the cylindrical member 8.

Figure 3:
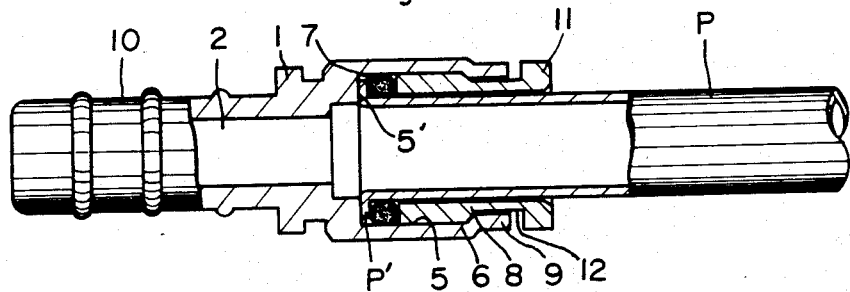
Figure 4:
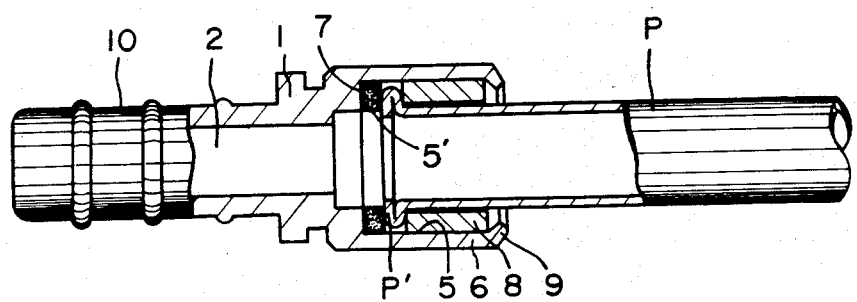

The couplings shown in FIGS. 3 and 4 are substantially similar to those of FIGS. 1 and 2, but are of the type which employs a straight joint for connecting a hose and a metal pipe. The joint 1 includes a cylindrical wall portion 10 to which a rubber or resin hose is connected. The pipe P shown in FIG. 4 has a radially outwardly projecting flange P' of the double-walled construction.

The cylindrical member 8 in each of the couplings shown in FIGS. 2 and 3 has at its outer end a radially outwardly projecting flange 11 which facilitates the insertion of the cylindrical member 8. It is also provided in its outer surface with an annular groove 12 in which the radially inwardly bent end 9 of the cylindrical wall portion 6 is received.

Figure 5:
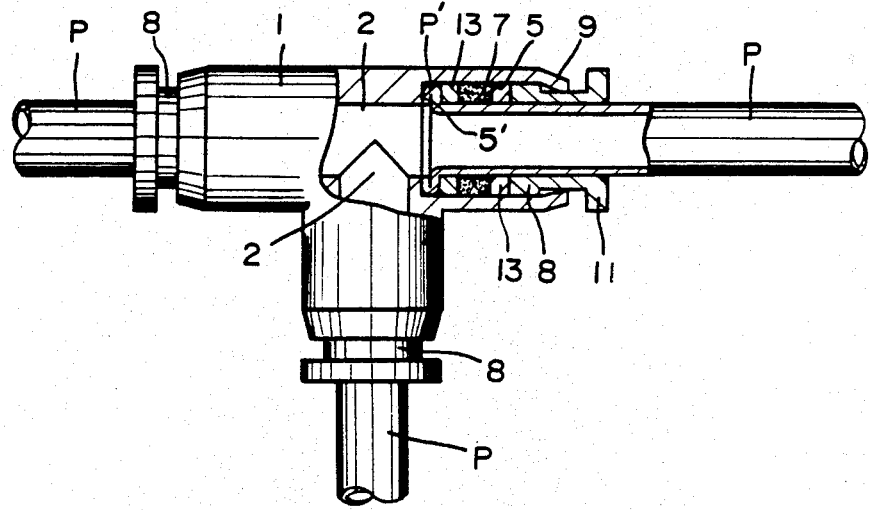
Figure 6:
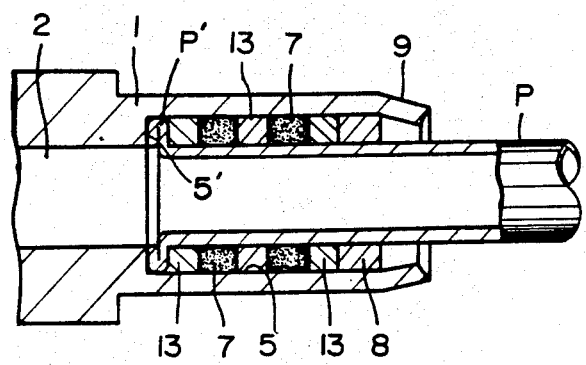
Figure 7:
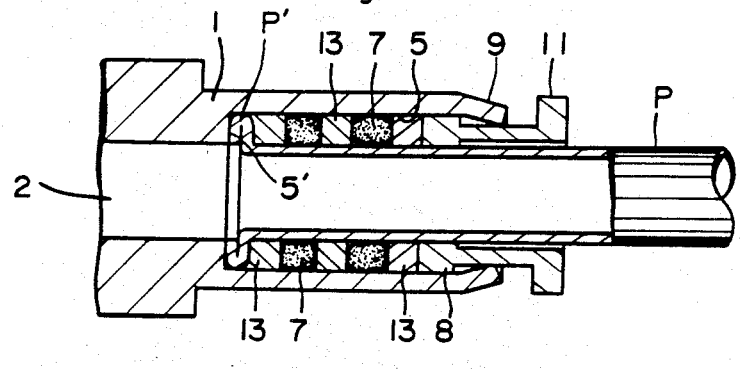
Figure 8:
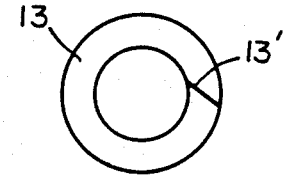
FIG. 8 is a front elevational view of a vibration absorbing ring.

FIGS. 5 to 7 show couplings of the type which employ a multiway joint 1. In the coupling of FIG. 5, a vibration absorbing ring 13 is provided on each side of the seal ring 7. The ring 13 is split as shown at 13' in FIG. 8. In the coupling of FIG. 6 or 7, at least one pair of seal and vibration absorbing rings 7 and 13 are provided between the flange P' of pipe P and the cylindrical member 8. The ring or rings 13 absorb the vibration of the seal ring or rings 7 and thereby improve the life and sealing effect thereof.

Figure 9:
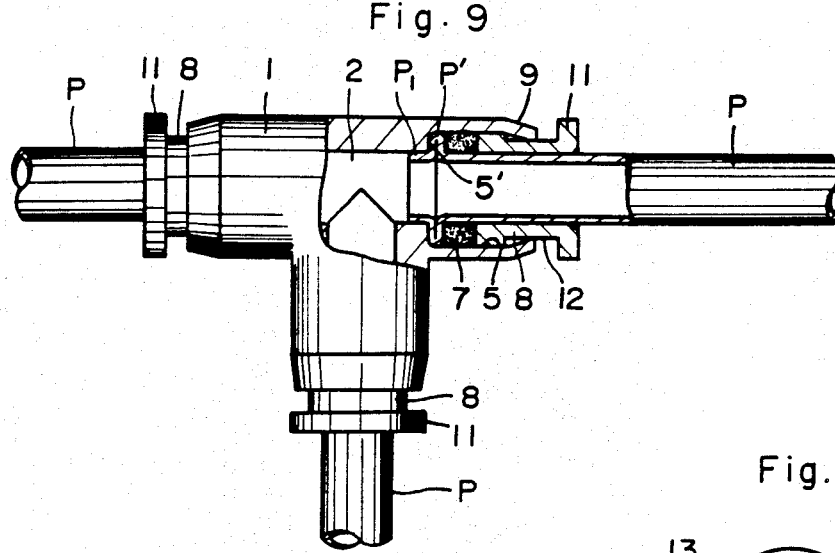
FIGS. 9 to 12 are views similar to FIG. 1, but showing still other embodiments of this invention.
Figure 10:
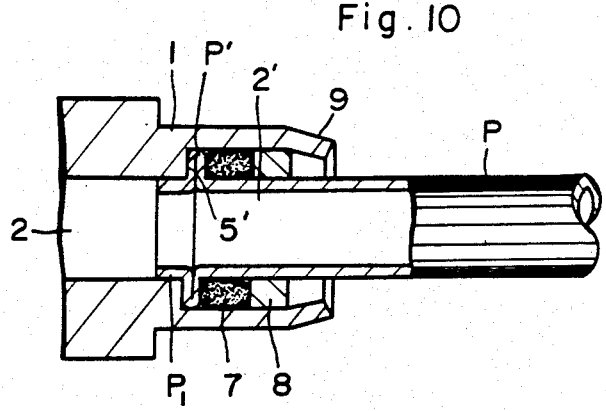
Figure 11:
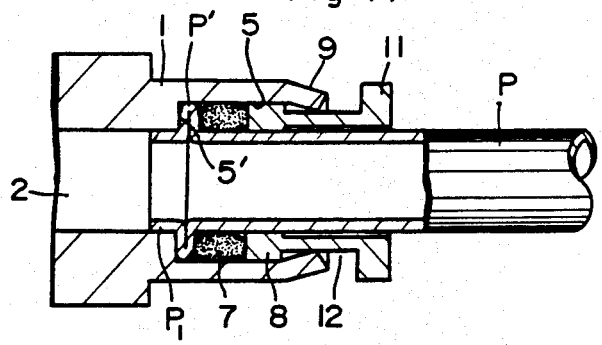

The couplings shown in FIGS. 9 to 11 are also of the type which employs a multiway joint. In each of the couplings shown in FIGS. 9 to 11, however, the pipe P includes a tubular projection $P_1$ provided inwardly of its flange P' and extending into the fluid passageway 2 of the joint 1. This arrangement facilitates the positioning of the pipe relative to the joint when they are joined, and also enables a reduction in any fatigue stress that might otherwise occur to the pipe and the joint.

The cylindrical member 8 in any of the couplings hereinabove described may be a rigid member formed from a metal. Alternatively, it may be formed from a flexible material, such as rubber, a synthetic resin, or a reinforced synthetic resin containing glass fibers. The cylindrical member 8 formed from a flexible material can maintain its intimate contact with the outer surface of the pipe P and absorb any vibration to thereby reduce the scratches on the pipe due to fatigue stress or interference. Its flexibility and the compressive deformation of the seal ring 7 produce an improved sealing effect.

Figure 12:
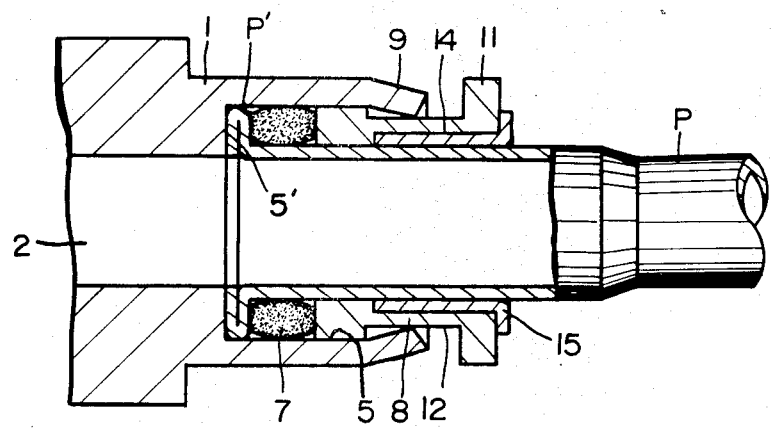
Figure 12A:
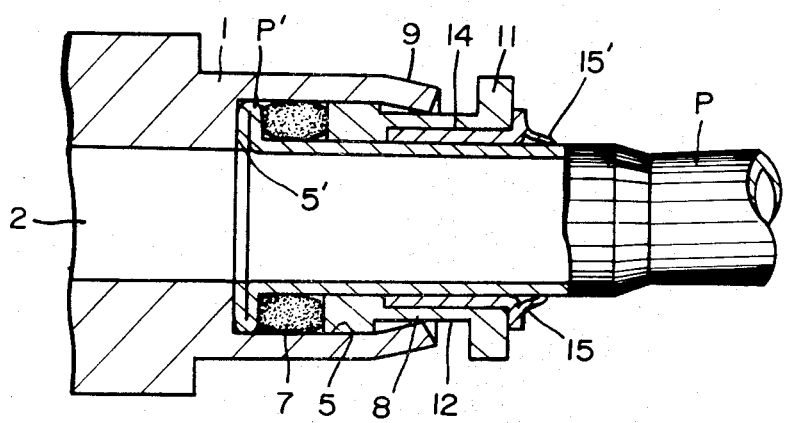
FIG. 12A is a view showing a modified form of the coupling shown i 12.

The cylindrical member 8 may also be formed only partly from a flexible material. FIG. 12 shows an example of such construction. The cylindrical member 8 has an annular groove 14 facing the pipe P and a ring 15 of a flexible material is fitted in the groove 14. FIG. 12A shows a modified form of the flexible ring 15. It has an axially extending annular lip 15' contacting the outer surface of the pipe P intimately and providing an improved dust seal.

Figure 13:
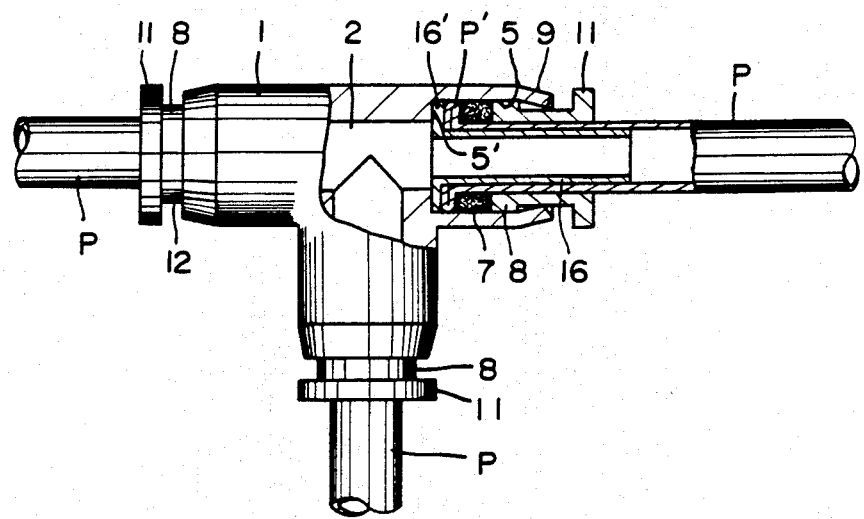
FIGS. 13 to 21 are views similar to FIG. 1, but showing further embodiments of this invention.
Figure 14:
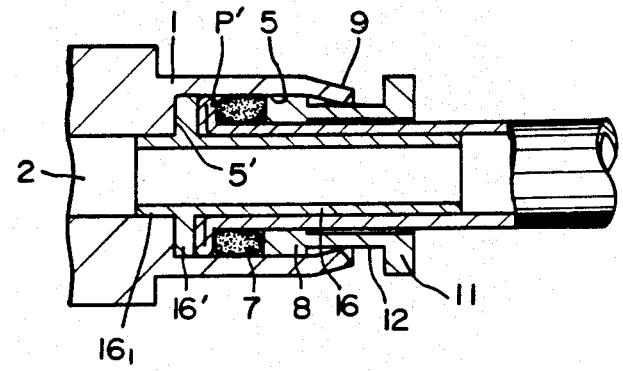

In order to achieve an improved rigidity and a reduction in fatigue stress due to vibration, it is effective to provide a sleeve 16 inside or outside the pipe P, as shown in FIGS. 13 to 19. In each of FIGS. 13 to 16B, the sleeve 16 is fitted inside the pipe P. The sleeve 16 has a radially outwardly projecting flange 16' held between the shoulder 5' of the Joint 1 and the flange P' of the pipe P, as shown in FIG. 13. The shoulder 5' is provided on its outer periphery with a stepped portion 5'' so as to prevent the scratch from being occured between the outer periphery of the flange 16' and the inner periphery of the annular opening 5.

Figure 15:
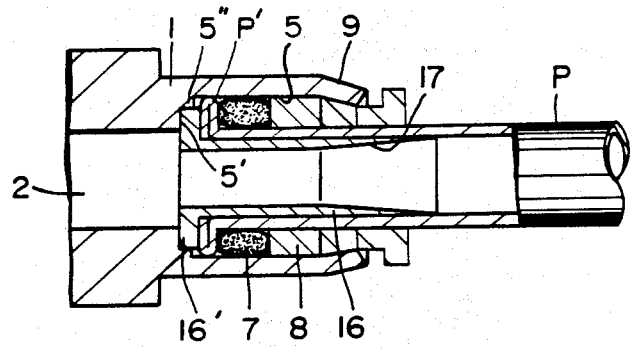
Figure 16A:
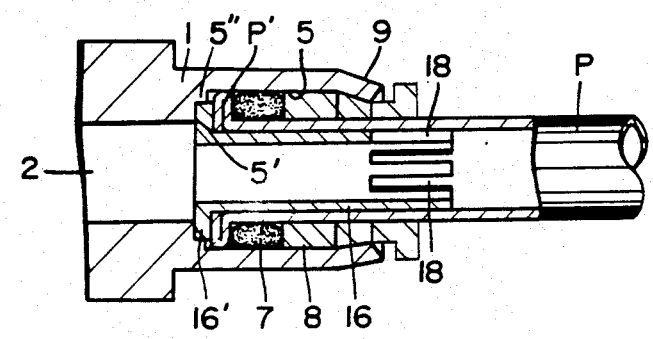
Figure 16B:
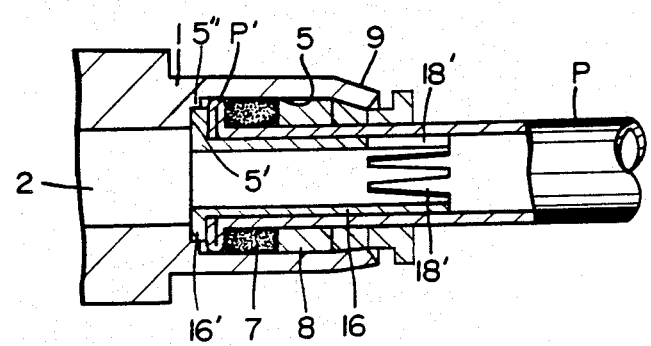
Figure 16C:
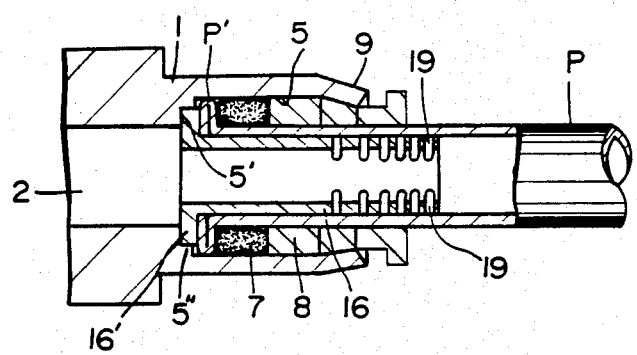
Figure 16D:
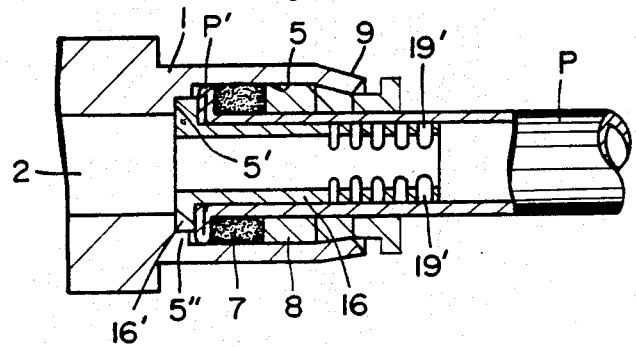
Figure 16E:
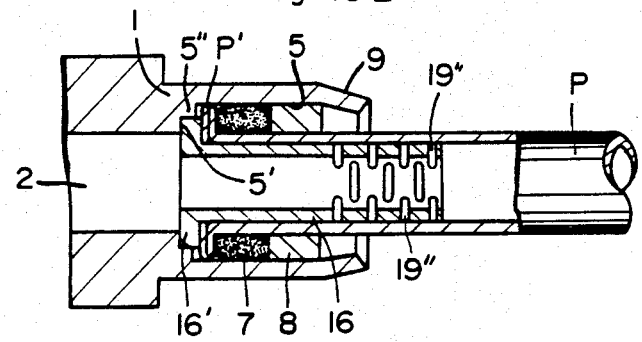
Figure 16F:
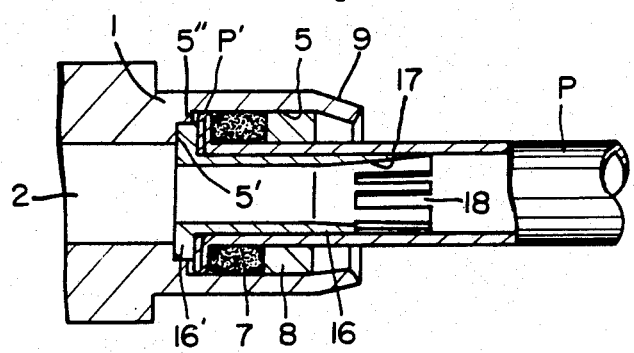

The sleeve 16 may have an axial extension $16_1$ projecting from the flange 16' into the fluid passageway 2 of the Joint 1, as shown in FIGURE , or may have a rear end portion 17 having a gradually decreasing wall thickness as shown in FIG. 15, or may have a plurality of axially parallel slits 18 or axially and rearwardly flared slits as shown in FIG. 16A or 16B, or a plurality of radial slits 19 arranged at an interval which becomes proportionally narrower toward the rearward or radial slits 19' having a width which becomes proportionally wider in the rearwardly arranged slits as shown in FIGS. 16C or 16D, or a plurality of radial slits arranged alternately in the axial direction as shown in FIG. 16E. These arrangements are effective for reducing the concentration of stress and preventing the cracking or breakage of the sleeve due to vibration. Similar effect can be obtained by such the combination of the rear end 17 portion having a gradually decreasing wall thickness and the slits 18 as shown in FIG. 16F.

Figure 17:
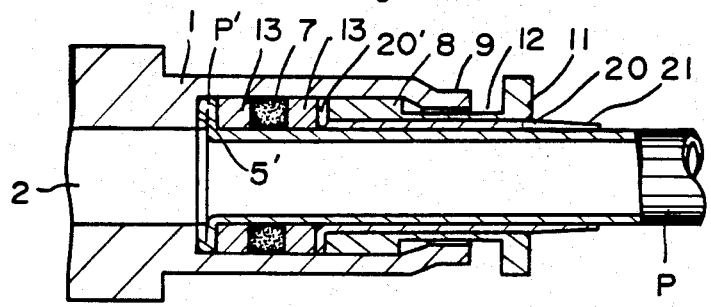
Figure 18:
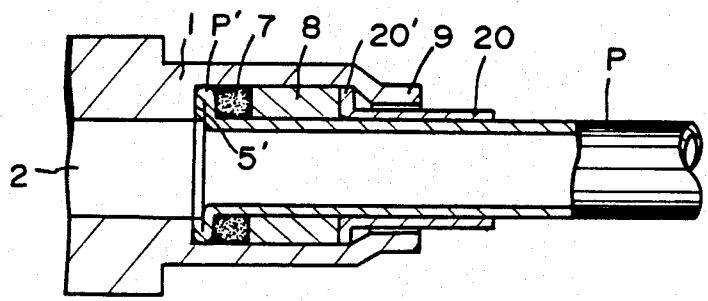
Figure 19:
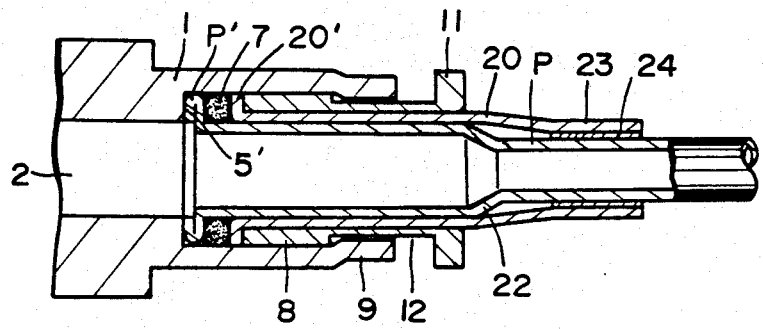

Similar results can be obtained from the arrangements shown in FIGS. 17 to 19, in which the sleeve 20 is fitted about the pipe P. The sleeve 20 shown in FIG. 17 has an outwardly proJecting flange 20' held between the cylindrical member 8 and an elastic combination formed by an elastic seal ring 7 and a pair of vibration absorbing rings 13 between which the seal ring 7 is disposed, and a rear end portion 21 having a gradually decreasing wall thickness. It is, of course, possible to provide axial or radial slits or the combination of the slits with the rear end portion, as shown in FIG. 16A or 16F, instead of the portion 21. The sleeve 20 shown in FIG. 18 has radially outwardly proJecting flange 20' held between the cylindrical member 8 and the radially inwardly bent end 9. The sleeve 20 shown in FIG. 19 has a diametrically reduced rear end portion 23 fitted about the pipe P. A sliding member 24 is preferably disposed between the portion 23 and the pipe P. The pipe P shown in FIG. 19 is of the type having a diametrically enlarged portion 22, as will hereinafter be described in further detail.

Figure 20:
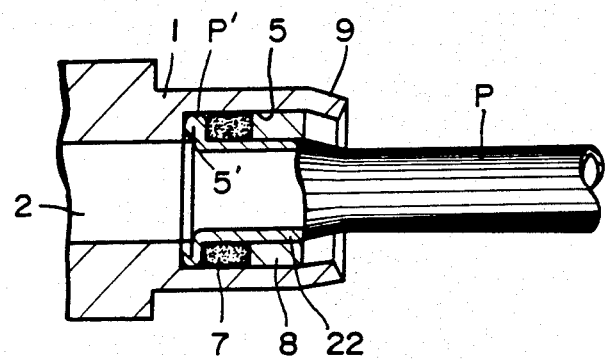
Figure 21:
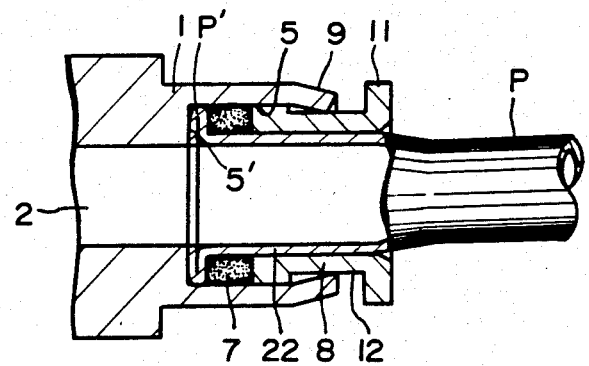

FIG. 20 and 21 show the diametrically enlarged portion 22 of the pipe P which is fitted in the cylindrical wall portion 6. The portion 22 facilitates the movement of the seal ring 7, the cylindrical member 8, the sleeve 20 and the vibration absorbing ring 13 on the pipe P and thereby their positioning and also improves the fatigue strength of the pipe.

Figure 22:
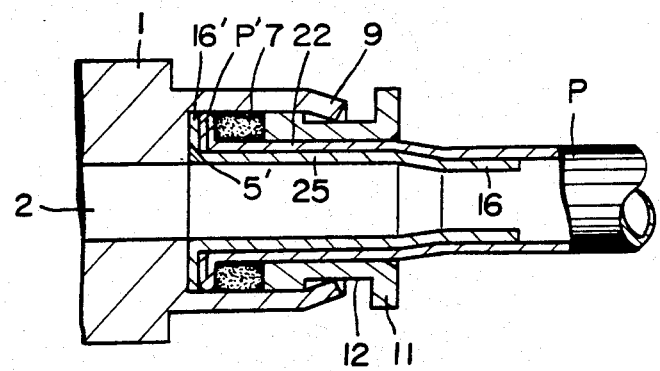
FIGS. 22 and 23 are fragmentary views showing combinations of two embodiments.
Figure 23:
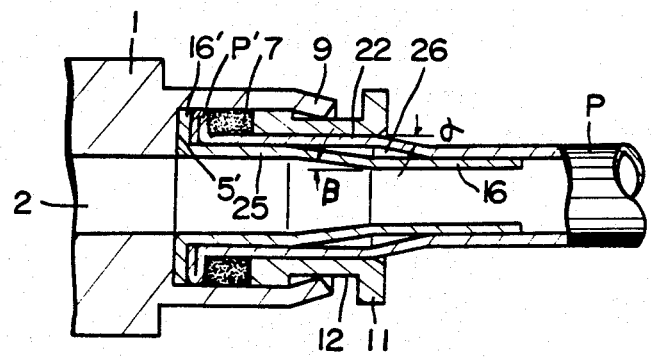
Figure 24:
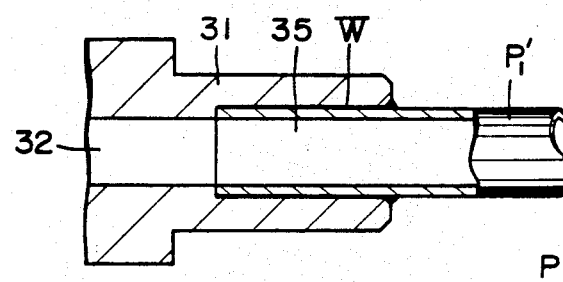
FIG. 24 is a fragmentary longitudinal sectional view of a known coupling.

It is possible to combine two or more of the embodiments which have hereinabove been described. The sleeve 16 shown in FIG. 22 has a diametrically enlarged portion 25 and an outer surface contacting intimately the inner surface of the pipe P having a diametrically enlarged portion 22. In FIG. 25, the diametrically enlarged portion 22 of the pipe P has an angle $\alpha$ which is larger than the angle $\beta$ of the diametrically enlarged portion 25 of the sleeve 16, so that a clearance 26 may be formed between the inner surface of the pipe P and the outer surface of the sleeve 16 to improve the vibration resistance of the pipe P. The following arrangements are also possible by way of example:

(a) An elastic combination of the seal and vibration absorbing rings 7 and 13 can be used with the pipe P having a tubular extension $P_1$, the cylindrical member 8 having a flexible portion, the sleeve 16 or 20, or the pipe P having a diametrically enlarged portion 22;

(b) The pipe P having a tubular extension $P_1$ can be used with the cylindrical member 8 having a flexible portion, or the sleeve 20, or can be formed with a diametrically enlarged portion 22; and (c) The inner and outer sleeves 16 and 20 can be used together.

What is claimed is:

1. In a coupling for connecting a metal pipe to a pipe joint having a bore defining a fluid passageway, the improvement which comprises:

said joint including an annular shoulder, a cylindrical wall portion extending from said annular shoulder and defining a larger diameter than said annular shoulder, said cylindrical wall portion having a radially inwardly directed end spaced from said annular shoulder;

said pipe extending into said cylindrical wall portion and having an end provided with a radially outwardly projecting flange disposed within the cylindrical wall portion;

a generally annular elastic seal ring provided in said cylindrical wall portion and generally adjacent to said flanges; and a cylindrical member surrounding a portion of said pipe, at least a portion of said cylindrical member being disposed between said cylindrical wall portion and said pipe, said cylindrical member having an annular groove extending around its outer periphery, with the inwardly directed end of said joint being engaged in said annular groove, said groove being disposed and said cylindrical member being dimensioned such that said portion of said cylindrical member, said flange and said seal ring are held between said inwardly directed end of said cylindrical wall portion and said shoulder.

2. A coupling as set forth in claim 1, wherein said cylindrical member has a radially outwardly projecting flange on a portion thereof disposed outwardly from said cylindrical wall portion.

3. A coupling as set forth in claim 1, wherein the inner surface of said cylindrical member and the outer surface of said pipe have a clearance therebetween.

4. A coupling as set forth in claim 1, wherein said seal ring is disposed between said flange and said shoulder.

5. A coupling as set forth in claim 1, wherein said seal ring is disposed between said flange and said cylindrical member.

6. A coupling as set forth in claim 5, further including a vibration absorbing ring provided on at least one side of said seal ring.

7. A coupling as set forth in claim 1, wherein said pipe includes a tubular extension projecting inwardly from said flange into said fluid passageway.

8. A coupling as set forth in claim 1, wherein said cylindrical member includes a flexible portion on at least the inner surface thereof and said inner surface contacts the outer surface of said pipe intimately.

9. A coupling as set forth in claim 1, wherein said cylindrical member is formed from a flexible material and has an inner surface contacting the outer surface of said pipe intimately.

10. A coupling as set forth in claim 1, further including a sleeve fitted in said pipe and having at one end a radially outwardly projecting flange contacting said flange of said pipe.

11. A coupling as set forth in claim 10, wherein said sleeve includes an axial extension projecting from said flange thereof into said fluid passageway.

12. A coupling as set forth in claim 10, wherein the end of said sleeve opposite said flange of said pipe has a gradually decreasing wall thickness.

13. A coupling as set forth in claim 10, wherein the end of said sleeve opposite said flange of said pipe has a plurality of slits.

14. A coupling as set forth in claim 1, further including a sleeve fitted about said pipe and having at one end thereof a radially outwardly projecting flange disposed within said cylindrical portion.

15. A coupling as set forth in claim 14 wherein the end of said sleeve opposite said outwardly projecting flange has a gradually decreasing wall thickness.

16. A coupling as set forth in claim 14 wherein the end of said sleeve opposite said outwardly projecting flange has a plurality of slits.

17. A coupling as set forth in claim 1, wherein said pipe has a diametrically enlarged portion located in said cylindrical wall portion.

18. A coupling as set forth in claim 1, wherein said joint is selected from the group consisting of: a straight joint, an eye joint, an L-shaped joint and a multiway joint.

19. In a coupling for connecting a metal pipe to a pipe joint having a bore defining a fluid passageway, the improvement which comprises:

said joint including an annular shoulder, a cylindrical wall portion extending from said annular shoulder and defining a larger diameter than said annular shoulder, said cylindrical wall portion having a radially inwardly directed end spaced from said annular shoulder;

said pipe extending into said cylindrical wall portion and having an end provided with a radially outwardly projecting flange disposed within the cylindrical wall portion;

a generally annular elastic seal ring provided in said cylindrical wall portion and generally adjacent to said flange;

a sleeve fitted about said pipe and having at one end thereof a radially outwardly projecting flange disposed within said cylindrical wall portion; and a cylindrical member surrounding a portion of said pipe, at least a portion of said cylindrical member being disposed between said cylindrical wall portion and said pipe and being dimensioned such that said portion of said cylindrical member, said flange of said pipe, said flange of said sleeve and said seal ring are held between said inwardly directed end of said cylindrical wall portion and said shoulder.

* * * * *